US010972008B2

(12) United States Patent
Lee

(10) Patent No.: US 10,972,008 B2
(45) Date of Patent: Apr. 6, 2021

(54) DC-DC CONVERTER, DISPLAY DEVICE HAVING THE SAME, AND DRIVING METHOD THEREOF

(71) Applicant: Samsung Display Co., Ltd., Yongin-si (KR)

(72) Inventor: Yoon Young Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/444,329

(22) Filed: Jun. 18, 2019

(65) Prior Publication Data

US 2020/0144916 A1 May 7, 2020

(30) Foreign Application Priority Data

Nov. 5, 2018 (KR) .......................... 10-2018-0134607

(51) Int. Cl.
*H02M 3/158* (2006.01)
*G09G 3/3233* (2016.01)
*H02M 1/00* (2006.01)

(52) U.S. Cl.
CPC .......... *H02M 3/158* (2013.01); *G09G 3/3233* (2013.01); *H02M 1/0061* (2013.01); *G09G 2330/02* (2013.01); *H02M 2001/0003* (2013.01)

(58) Field of Classification Search
CPC ................ H02M 3/158; H02M 1/0061; H02M 2001/0003; G09G 3/3233; G09G 2330/02
USPC ........................................................ 363/123
See application file for complete search history.

(56) References Cited

U.S. PATENT DOCUMENTS

| 8,120,261 | B2 * | 2/2012 | Park | G09G 3/3225 |
| | | | | 315/166 |
| 9,058,773 | B2 | 6/2015 | Park | |
| 9,337,718 | B2 * | 5/2016 | Park | H05B 45/60 |
| 9,558,693 | B2 * | 1/2017 | An | G09G 3/3208 |
| 10,157,574 | B2 * | 12/2018 | Park | G06F 1/3296 |
| 2008/0061322 | A1 * | 3/2008 | von Kluge | H01L 27/10876 |
| | | | | 257/213 |
| 2008/0174287 | A1 * | 7/2008 | Park | H05B 45/60 |
| | | | | 323/271 |

(Continued)

OTHER PUBLICATIONS

STIC search report from EIC 2800 searcher Christian Miner. (Year: 2019).*

*Primary Examiner* — Shawki S Ismail
*Assistant Examiner* — Htet Z Kyaw
(74) *Attorney, Agent, or Firm* — Lewis Roca Rothgerber Christie LLP

(57) ABSTRACT

A display device includes a display panel which displays an image in a normal mode or low power mode. A DC-DC converter supplies a source driving voltage to the data driver, and supplies a first power voltage to the power line of the display panel in the normal mode. The data driver supplies a first auxiliary power voltage to the power line of the display panel in the low power mode. The DC-DC converter gradually changes the voltage level of the first power voltage to a reference output voltage level over a first period when the display panel initially enters into the normal mode, and changes the voltage level of the first power voltage to the reference output voltage level over a second period shorter than the first period when the mode of the display panel is switched from the low power mode to the normal mode.

20 Claims, 8 Drawing Sheets

(56) References Cited

U.S. PATENT DOCUMENTS

| | | | |
|---|---|---|---|
| 2009/0140661 A1* | 6/2009 | Park | G09G 3/3225 315/169.3 |
| 2009/0237854 A1* | 9/2009 | Mok | H02M 3/156 361/111 |
| 2012/0069059 A1* | 3/2012 | Lee | G09G 3/3225 345/690 |
| 2013/0082910 A1* | 4/2013 | Lee | G09G 3/3208 345/76 |
| 2014/0097819 A1* | 4/2014 | Matsui | H02M 3/157 323/283 |
| 2014/0159690 A1* | 6/2014 | Matsui | H02M 3/157 323/283 |
| 2015/0302793 A1* | 10/2015 | In | G09G 5/18 345/211 |
| 2016/0014857 A1* | 1/2016 | Park | H05B 45/60 315/294 |
| 2016/0049872 A1* | 2/2016 | Park | H02M 1/088 345/212 |
| 2016/0117979 A1* | 4/2016 | An | G09G 3/3208 345/211 |
| 2016/0125791 A1* | 5/2016 | Park | G09G 3/3208 345/211 |
| 2016/0247454 A1* | 8/2016 | Park | G09G 3/3266 |
| 2017/0148390 A1* | 5/2017 | Park | G09G 3/3225 |
| 2017/0243530 A1* | 8/2017 | Kwon | H02M 1/15 |
| 2018/0061322 A1* | 3/2018 | Yim | G09G 3/20 |

* cited by examiner

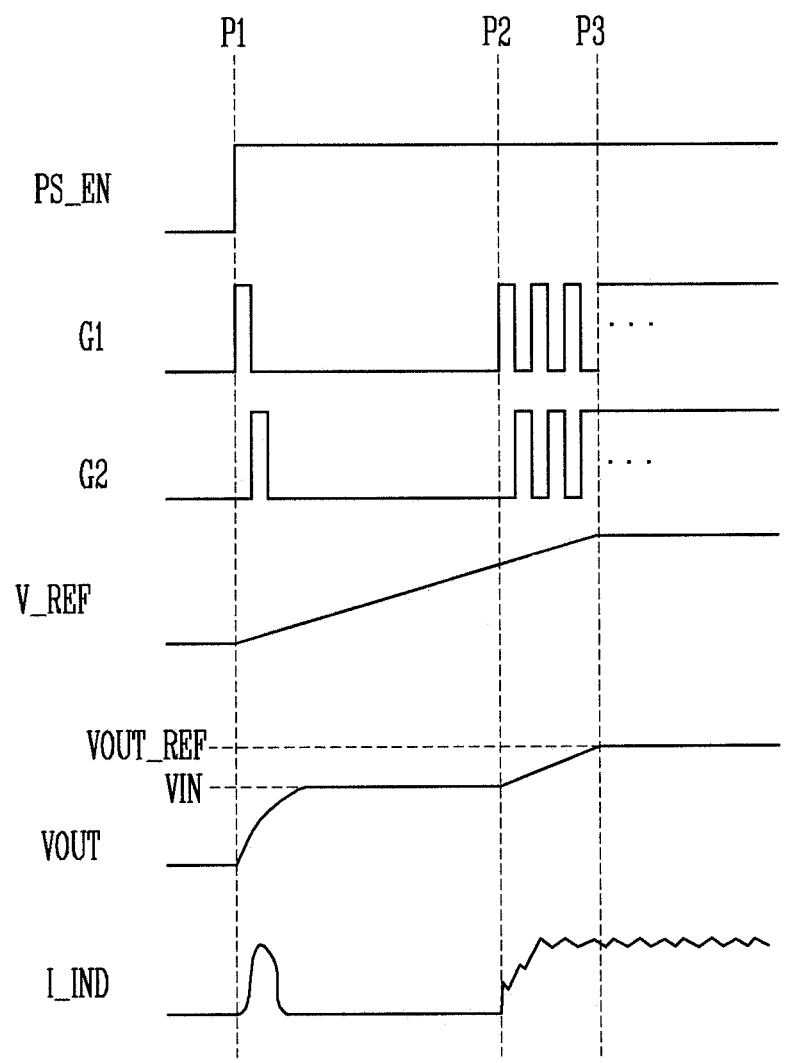

DC-DC CONVERTER, DISPLAY DEVICE HAVING THE SAME, AND DRIVING METHOD THEREOF

CROSS-REFERENCE TO RELATED APPLICATION

This application claims priority to and the benefit of Korean patent application 10-2018-0134607 filed on Nov. 5, 2018 in the Korean Intellectual Property Office, the entire disclosure of which is incorporated herein by reference.

BACKGROUND

1. Field

The present disclosure generally relates to a DC-DC converter, a display device having the same, and a driving method thereof.

2. Related Art

A display device includes a DC-DC converter for generating a power voltage to drive pixels by converting input power supplied from the outside. For example, the DC-DC converter supplies the generated power voltage to the pixels through a power line.

In order to reduce power consumption, a recent display device provides various operation modes of a DC-DC converter according to a load of an image.

SUMMARY

A drop of a power voltage may occur in a switching process between the operation modes of the DC-DC converter, and deterioration of display quality such as screen blinking may occur due to the drop of the power voltage.

Aspects of embodiments of the present disclosure are directed to a DC-DC converter capable of preventing display quality from being deteriorated in a switching process between operation modes of the DC-DC converter, a display device having the DC-DC converter, and a driving method of the display device.

According to an embodiment of the present disclosure, a display device is provided. The display device includes a display panel including a plurality of pixels and a power line, the display panel being configured to display an image in a normal mode and to display an image in a low power mode; a data driver configured to provide a data signal to the display panel; and a DC-DC converter configured to supply a source driving voltage to the data driver, and to supply a first power voltage to the power line of the display panel in the normal mode, wherein the data driver supplies a first auxiliary power voltage to the power line of the display panel in the low power mode, wherein the DC-DC converter is configured to output the first power voltage and to change a voltage level of the first power voltage to a reference output voltage level over a first period when the display panel initially enters into the normal mode, and wherein the DC-DC converter is configured to output the first power voltage and to change the voltage level of the first power voltage to the reference output voltage level over a second period shorter than the first period when the mode of the display panel is switched from the low power mode to the normal mode.

In some embodiments, the display panel is configured to display a normal image in the normal mode, and to display a low power image having a load smaller than a load of the normal image in the low power mode.

In some embodiments, the DC-DC converter includes an inductor and a plurality of transistors coupled between a reception terminal for receiving an input voltage and an output terminal for outputting the first power voltage, wherein, when the display panel initially enters into the normal mode, the DC-DC converter is configured to precharge the input voltage by turning on one of the transistors, and wherein the DC-DC converter is configured to, after the input voltage is precharged, output the first power voltage using a driving scheme where a first inductor current is generated by alternately turning on the transistors.

In some embodiments, the DC-DC converter is configured to, when the mode of the display panel is switched from the low power mode to the normal mode, output the first power voltage using a second driving scheme where the first inductor current is generated by alternately turning on the transistors.

In some embodiments, the display device includes a gate driver configured to provide a gate signal to the display panel, wherein the data driver is configured to generate a first high voltage and a first low voltage based on the source driving voltage, and to supply the first high voltage and the first low voltage to the gate driver, wherein one of the first high voltage and the first low voltage has a turn-on voltage level configured to turn a transistor on when applied to a gate of the transistor, and the other of the first high voltage and the first low voltage has a turn-off voltage level configured to turn the transistor off when applied to the gate of the transistor.

In some embodiments, the DC-DC converter includes: a first converter configured to generate the first power voltage; a second converter configured to generate a second power voltage having a voltage level lower than the voltage level of the first power voltage; and a third converter configured to generate the source driving voltage, wherein the second converter is configured to supply the second power voltage to the display panel in the normal mode.

In some embodiments, the first converter includes: a first inductor coupled between an input end to which an input voltage is applied and a first node; a first transistor coupled between the first node and a ground, the first transistor being configured to turn on in response to a first switching control signal; a second transistor coupled between an output end from which the first power voltage is output and the first node, the second transistor being configured to turn on in response to a second switching control signal; and a switching controller configured to generate the first switching control signal and the second switching control signal.

In some embodiments, the first converter further includes a discharge circuit coupled between the output end and the ground, and wherein an impedance of the discharge circuit in the low power mode is larger than an impedance of the discharge circuit in the normal mode.

In some embodiments, the discharge circuit includes a third transistor coupled between the output end and the ground, and wherein the third transistor is configured to turn on in response to a discharge control signal having the turn-on voltage level in the normal mode, and to turn off in response to the discharge control signal having the turn-off voltage level in the low power mode.

In some embodiments, the switching controller is configured to select a driving scheme of the first and second transistors based on the voltage level of the discharge control signal.

In some embodiments, the discharge control signal is received from the data driver.

In some embodiments, the first converter is configured to output the first power voltage using a first driving scheme when the display panel enters into the normal mode but is not switched from the low power mode, wherein in the first driving scheme, a first inductor current through the first inductor is generated by sequentially turning on the first and second transistors when the display panel initially enters into the normal mode and alternately turning on the first and second transistors after the voltage level of the output voltage is equal to the voltage level of the input voltage.

In some embodiments, the first converter is configured to output the first power voltage using a second driving scheme when the display panel is switched from the low power mode to the normal mode, wherein in the second driving scheme, the first inductor current is generated by alternately turning on the first and second transistors.

In some embodiments, the DC-DC converter is configured to generate a mode control signal for switching between the normal mode and the low power mode, wherein the first power voltage increases at a transition time of the mode control signal, and the first auxiliary power voltage decreases at the transition time of the mode control signal.

In some embodiments, the DC-DC converter is configured to generate a mode control signal for switching between the normal mode and the low power mode, wherein the first power voltage increases at a transition time of the mode control signal, and the first auxiliary power voltage decreases after the first power voltage reaches a reference output voltage.

According to another embodiment of the present disclosure, a DC-DC converter is provided. The DC-DC converter includes: a first inductor coupled between an input end to which an input voltage is applied and a first node; a first transistor coupled between the first node and a ground, the first transistor being configured to turn on in response to a first switching control signal; a second transistor coupled between an output end from which a first power voltage is output and the first node, the second transistor being configured to turn on in response to a second switching control signal; and a switching controller configured to generate the first switching control signal and the second switching control signal, wherein the first power voltage is applied to a display panel in a normal mode, the display panel having the normal mode and a low power mode, wherein the switching controller is configured to sequentially turn on the first and second transistors when the display panel initially enters into the normal mode, and to alternately turn on the first and second transistors after the voltage level of the output voltage is equal to the voltage level of the input voltage, and wherein the switching controller is configured to alternately turn on the first and second transistors when the display panel is switched from the low power mode to the normal mode.

In some embodiments, the voltage level of the first power voltage is changed to a reference output voltage level over a first period when the display panel initially enters into the normal mode, and wherein the voltage level of the first power voltage is changed to the reference output voltage level over a second period shorter than the first period when the mode of the display panel is switched from the low power mode to the normal mode.

In some embodiments, the DC-DC converter includes a third transistor coupled between the output end and the ground, wherein the third transistor is configured to turn on in response to a discharge control signal having a turn-on voltage level in the normal mode, and to turn off in response to the discharge control signal having the turn-off voltage level in the low power mode.

In some embodiments, the switching controller is configured to select a driving scheme of the first and second transistors based on the voltage level of the discharge control signal.

According to another embodiment of the present disclosure, a method of driving a display device is provided. The method includes: driving a display panel in a normal mode; determining whether a previous mode is a low power mode, the previous mode being a mode in a period immediately before the display panel entered into the normal mode; selecting one of a first driving scheme and a second driving scheme based on whether the previous mode was the low power mode; generating a first power voltage utilizing the selected driving scheme; and supplying the first power voltage to the display panel, wherein the generating the first power voltage includes: when the previous mode is not the low power mode, outputting the first power voltage and gradually changing the voltage level of the first power voltage to a reference output voltage level over a first period; and when the previous mode is the low power mode, outputting the first power voltage and changing the voltage level of the first power voltage to the reference output voltage level over a second period shorter than the first period.

BRIEF DESCRIPTION OF THE DRAWINGS

FIGS. 4A and 4B are waveform diagrams illustrating an example of signals measured according to driving schemes of the first converter of FIG. 3.

DETAILED DESCRIPTION

Figure 1:
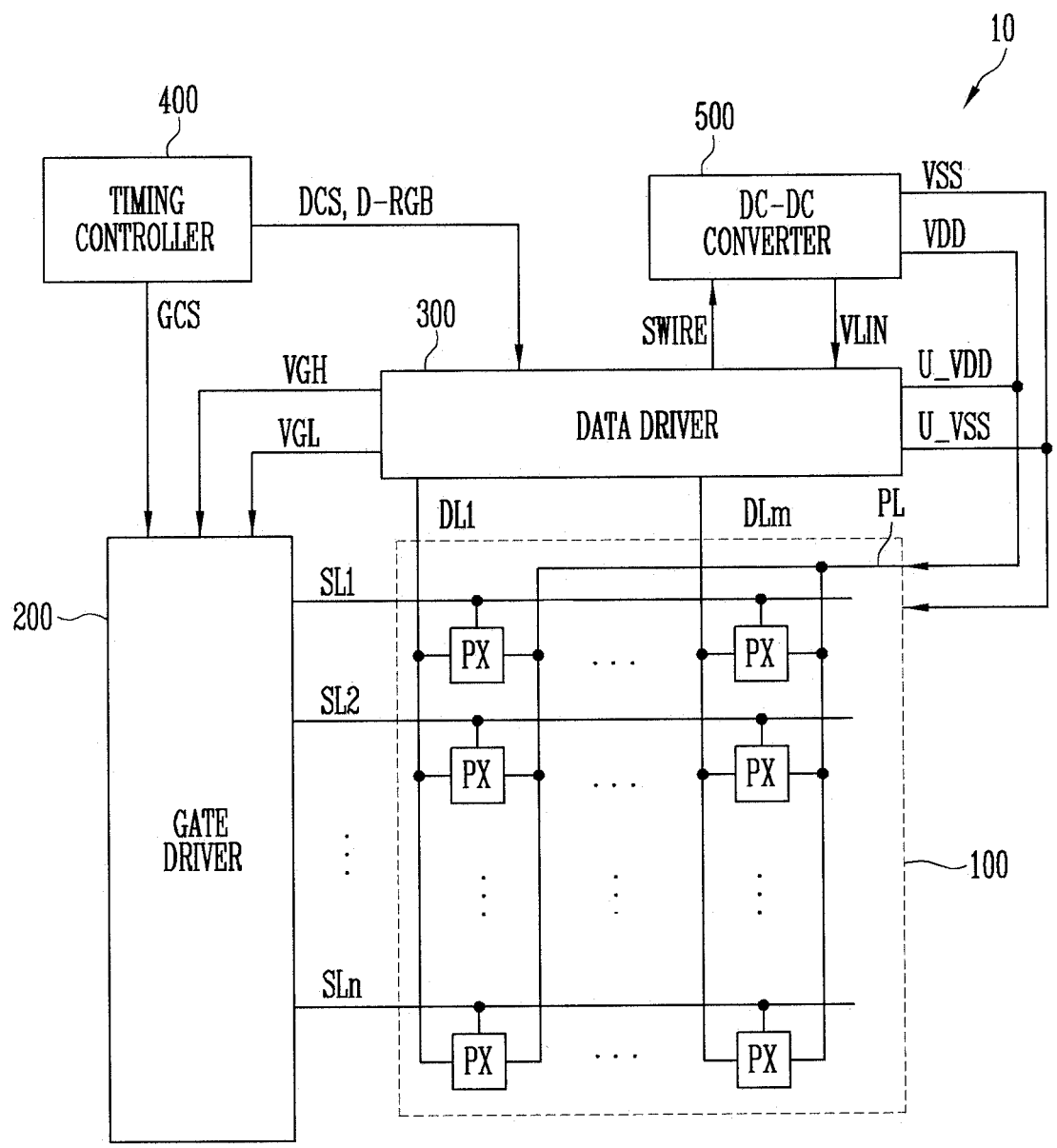
FIG. 1 is a diagram illustrating a display device according to an embodiment of the present disclosure.

Hereinafter, exemplary embodiments are described in detail with reference to the accompanying drawings so that those skilled in the art may easily practice the present disclosure. However, the embodiments according to the present disclosure may be in different forms and should not be construed as limited to the embodiments set forth herein. Rather, these exemplary embodiments are provided so that this disclosure will be thorough and complete, and will fully convey the scope of the present invention to those skilled in the art.

The present disclosure may be implemented in various different forms and is not limited to the exemplary embodiments described in the present specification.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

A part irrelevant to the description may be omitted to clearly describe the present disclosure, and the same or similar constituent elements will be designated by the same reference numerals throughout the specification. Therefore, the same reference numerals may be used in different drawings to identify the same or similar elements.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

FIG. 1 is a diagram illustrating a display device according to an embodiment of the present disclosure.

Referring to FIG. 1, the display device 10 includes a display panel 100, a gate driver 200, a data driver 300, a timing controller 400, and a DC-DC converter 500.

The display panel 100 displays an image. The display panel 100 may include gate lines SL1 to SLn (n being an integer of 2 or more), data lines DL1 to DLm (m being an integer of 2 or more), a power line PL, and at least one pixel PX.

The pixel PX may be located in areas defined by the gate lines SL1 to SLn and the data lines DL1 to DLm.

The pixel PX may include a light emitting device, a switching transistor, a driving transistor, and a storage capacitor. The light emitting device may be electrically coupled between a first power voltage VDD and a second power voltage VSS. The first power voltage VDD and the second power voltage VSS may be a high potential voltage and a low potential voltage, respectively, to drive the pixel PX. The first power voltage VDD may have a voltage level higher than that of the second power voltage VSS, and may be provided through the power line PL. The light emitting device may be an organic light emitting device or inorganic light emitting device. The switching transistor may transfer a data signal provided through one of the data lines DL1 to DLm to the storage capacitor in response to a gate signal provided through one of the gate lines SL1 to SLn. The storage capacitor may store the data signal. The driving transistor may be coupled between the first power voltage VDD and the light emitting device, and transfer a driving current corresponding to the data signal to the light emitting device from the first power voltage VDD.

Although embodiments in which the display panel 100 is an organic light emitting display panel or inorganic light emitting display panel will primarily be discussed herein, the display panel 100 is not limited thereto. For example, the display panel 100 may be implemented as a liquid crystal display panel, and may control an emission amount of light supplied from a light source.

In some embodiments, the display panel 100 may display an image in a normal mode or in a low power mode (e.g., the display panel 100 may include both normal mode and low power mode for displaying images). The display panel 100 may display a normal image (e.g., a moving image) in the normal mode, and display a low power image (e.g., an image having a small load such as a clock image) in the low power mode. For example, the low power mode may limit the maximum luminance of the display panel 100 to a preset luminance, so that power consumption can be reduced or minimized. For example, the low power mode may be an Always On Display (AOD) mode in which simple display information is consistently displayed, a predetermined display mode in which a screen is displayed with a very low luminance when in a dark environment, or the like. In the low power mode, operations of some components included in the DC-DC converter 500 may be entirely or partially shut down. Accordingly, the supply of power to various functional blocks that are not used in the low power mode may be interrupted, so that unnecessary power consumption can be reduced. Whether the display panel 100 is operating in the normal mode or the low power mode may be determined by a mode switching signal provided from the outside (e.g., outside the display device 10 or outside the DC-DC converter 500), or may be determined by the timing controller 400, based on an image provided from the outside.

The gate driver 200 may be supplied with a gate control signal GCS from the timing controller 400, may generate a gate signal based on the gate control signal GCS, and may sequentially provide the gate signal to the gate lines SL1 to SLn.

The data driver 300 may be supplied with a data control signal DCS and image data D-RGB from the timing controller 400, may generate a data signal corresponding to the image data D-RGB, and may provide the data signal to the data lines DL1 to DLm.

In addition, the data driver 300 may receive a third power voltage VLIN from the DC-DC converter 500, may generate a high voltage (or first voltage) VGH and a low voltage (or second voltage) VGL based on the third power voltage VLIN, and may provide the high voltage VGH and the low voltage VGL to the gate driver 200. The third power voltage VLIN may be a source driving voltage to drive the data driver 300. One of the high voltage VGH and the low voltage VGL may have a turn-on voltage level at which transistors provided in the data driver 300 and the gate driver 200 are turned on, and the other of the high voltage VGH and the low voltage VGL may have a turn-off voltage level at which the transistors provided in the data driver 300 and the gate driver 200 are turned off. For example, the data driver 300 may include a boosting circuit (e.g., a boost circuit) and/or a regulating circuit, and may generate the high voltage VGH and the low voltage VGL through the boosting circuit and/or the regulating circuit.

In some embodiments, the data driver 300 may generate a first auxiliary power voltage U_VDD and a second auxiliary power voltage U_VSS. The first auxiliary power voltage U_VDD may have a voltage level equal or similar to that of the power voltage VDD, and the second auxiliary power voltage U_VSS may have a voltage level equal or similar to that of the second power voltage VSS.

For example, the data driver 300 may generate the first auxiliary power voltage U_VDD and the second auxiliary power voltage U_VSS through the boosting circuit and/or the regulating circuit.

In some embodiments, the data driver 300 may generate the first auxiliary power voltage U_VDD and the second auxiliary power voltage U_VSS in the low power mode, and provide the first auxiliary power voltage U_VDD and the second auxiliary power voltage U_VSS to the display panel 100 in the low power mode. The first auxiliary power voltage U_VDD may be provided to the pixel PX through the power line PL.

The data driver 300 may stop generation of the first auxiliary power voltage U_VDD and the second auxiliary power voltage U_VSS in the normal mode, and/or interrupt coupling to (e.g., by electrically disconnecting) the display panel 100 or a current flow path from the display panel 100 in the normal mode. As will be described later, the data driver 300 may increase impedance of an output end from which the first auxiliary power voltage U_VDD and the second auxiliary power voltage U_VSS are output.

The data driver 300 may generate a power control signal SWIRE and provide the control signal SWIRE to the DC-DC converter 500. The DC-DC converter 500 may determine a driving scheme (e.g., determine which driving scheme to use), which will be described later, based on the power control signal SWIRE.

The timing controller 400 may control the gate driver 200 and the data driver 300. The timing controller 400 may receive a control signal (e.g., a control signal including a clock signal) from the outside (e.g., outside the display device 10), and generate the gate control signal GCS and the data control signal DCS, based on the control signal.

In addition, the timing controller 400 may generate image data D-RGB by realigning input data (or original image data) provided from the outside (e.g., a graphic processor), and provide the image data D-RGB to the data driver 300.

The DC-DC converter 500 may generate the first power voltage VDD, the second power voltage VSS, and the third power voltage VLIN, based on or utilizing an input voltage provided from an external power source. The DC-DC converter 500 may provide the third power voltage VLIN to the data driver 300. In the normal mode, the DC-DC converter 500 may provide the first power voltage VDD and the second power voltage VSS to the display panel 100. The first power voltage VDD may be provided to the pixel PX through the power line PL. The DC-DC converter 500 may stop generation of the first power voltage VDD and the second power voltage VSS in the low power mode, and/or interrupt coupling to (e.g., by electrically disconnecting) the display panel 100 in the low power mode.

In some embodiments, the DC-DC converter 500 may be operated using a first driving scheme and a second driving scheme or be operated initially. Operated initially may refer to the period before the DC-DC converter 500 begins operating in the first or second driving scheme, including when the display panel 100 is initially turned on. The DC-DC converter 500 may gradually change the voltage level of the first power voltage VDD to a reference output voltage level (e.g., a voltage level of a power voltage intended for use in the display panel 100) during a first period using the first driving scheme, and output the first power voltage VDD having the changed voltage level (e.g., output the first power voltage VDD as its voltage level is gradually changed). Increasing the voltage level of the first power voltage VDD gradually may refer to increasing the voltage level for the duration of the first period or for substantially all of the duration of the first period. Increasing the voltage level of the first power voltage VDD gradually may also refer to increasing the voltage level by applying a single pulse to one or both switches of a switched mode power supply (see discussion of FIG. 4A, below). In addition, the DC-DC converter 500 may change the voltage level of the first power voltage VDD to the reference output voltage level during a second period which is shorter than the first period using the second driving scheme, and output the first power voltage VDD having the changed voltage level (e.g., output the first power voltage VDD as its voltage level is changed or rapidly changed). In some embodiments, the first driving scheme may be a driving scheme using a soft start scheme, and thus inrush current and damage of the display panel 100 due to the inrush current can be reduced or prevented. In some embodiments, the second driving scheme is a driving scheme which does not include a soft start scheme, and thus the first power voltage VDD can be more rapidly output (e.g., may reach the reference output voltage level more rapidly).

In an embodiment, when the display panel 100 is initially driven in the normal mode, the DC-DC converter 500 may use the first driving scheme where the first power voltage VDD is gradually changed during the first period. When the mode of the display panel 100 is switched from the low power mode to the normal mode, the DC-DC converter 500 may use the second driving scheme where the first power voltage VDD is changed (e.g., rapidly changed) during the second period. In an example, when the display panel 100 is turned on, the DC-DC converter 500 may output the first power voltage VDD using the first driving scheme, so that damage of the display panel 100 may be reduced or prevented. In another example, when the mode of the display panel 100 is switched from the low power mode in which a low power image is displayed to the normal mode in which a normal image is displayed, the DC-DC converter 500 may output the first power voltage VDD using the second driving scheme. Accordingly, a drop in the power voltage (e.g., the power voltage at the display panel 100), which may occur during the process of changing over or transferring the power voltage of the display panel 100 from the first auxiliary power voltage U_VDD to the first power voltage VDD, and potential deterioration of display quality due to the drop of the power voltage can be reduced or prevented.

In the low power mode, the display panel 100 is in a state in which the first auxiliary power voltage U_VDD is applied thereto (e.g., the first auxiliary power voltage U_VDD may be applied to the display panel 100 in the low power mode). This is equivalent (e.g., equal) to a state in which the display panel 100 is precharged with the first auxiliary power voltage U_VDD (i.e., a state in which an output voltage is precharged with an input voltage for a specific time so as to prevent occurrence of inrush current). Thus, although the DC-DC converter 500 changes (e.g., rapidly changes) the first power voltage and outputs the changed power voltage when the mode of the display panel 100 switches from the low power mode to the normal mode, inrush current and damage of the display panel 100 due to the inrush current may not occur or may be limited.

As described with reference to FIG. 1, in some embodiments, the display device 10 applies the first power voltage VDD and the second power voltage VSS to the display panel 100 through the DC-DC converter 500 in the normal mode, and supplies the first auxiliary power voltage U_VDD and the second auxiliary power voltage U_VSS to the display panel 100 through the data driver 300 in the low power mode, so that power consumption can be reduced. In addition, in some embodiments, the display device 10 gradually changes the first power voltage VDD when the display panel 100 initially enters into the normal mode (e.g., when the display device 10 is turned on), so that damage of the display panel 100 due to inrush current can be reduced or prevented. Furthermore, in some embodiments, the display device 10 changes the first power voltage VDD relatively rapidly (e.g., relative to the gradual rate of change used when initially entering the normal mode) when the mode of the display panel 100 is switched from the low power mode to the normal mode, so that deterioration of display quality due to a drop of a power voltage can be reduced or prevented.

Figure 2:
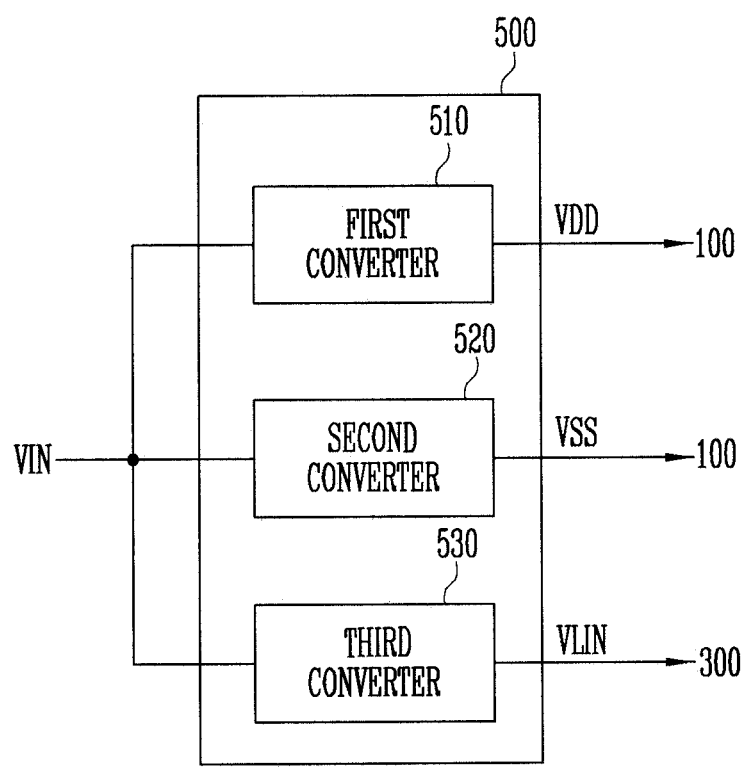
FIG. 2 is a block diagram illustrating an example of a DC-DC converter included in the display device of FIG. 1.

FIG. 2 is a block diagram illustrating a DC-DC converter included in the display device of FIG. 1 according to embodiments of the present disclosure.

Referring to FIG. 2, the DC-DC converter 500 may include a first converter 510, a second converter 520, and a third converter 530. The first converter 510 converts an input voltage VIN into a first power voltage VDD, the second converter 520 converts the input voltage VIN into a second power voltage VSS, and the third converter 530 converts the input voltage VIN into a third power voltage VLIN. The first converter 510 and the third converter 530 may be implemented with a boost converter, and the second converter 520 may be implemented with an inverting buck boost converter.

The first converter 510 and the second converter 520 may be operated in the normal mode (and, in some embodiments, turned off, disconnected, or operated at reduced power during the low power mode), and the third converter 530 may be operated in both the normal mode and the low power mode.

The first converter 510 may gradually change the voltage level of the first power voltage VDD to a reference output voltage level during a first period when the display panel 100 is initially driven in the normal mode, and output the first power voltage VDD having the changed voltage level. The first converter 510 may change the voltage level of the first power voltage VDD to the reference output voltage level during a second period which is shorter than the first period (e.g., may change the voltage level to the reference output voltage level over a shorter period of time than in the first period) when the mode of the display panel 100 is switched from the low power mode to the normal mode, and output the first power voltage VDD having the changed voltage level.

The first converter 510 may include an inductor and a plurality of transistors which are coupled between a reception terminal for receiving the input voltage VIN and an output terminal for outputting the first power voltage VDD. The first converter 510 precharges the input voltage VIN by turning on one of the transistors when the display panel 100 is initially driven in the normal mode, and allows the transistors to be alternately turned on after a certain time (e.g., a set time or a predetermined time) elapses, so that the first power voltage VDD can be output using a first driving scheme where a first inductor current is generated. Also, when the mode of the display panel 100 is switched from the low power mode to the normal mode, the first converter 510 allows the transistors to be alternately turned on without precharging of the input voltage VIN, so that the first power voltage VDD can be output using a second driving scheme where the first inductor current is generated. Each of the first driving scheme and the second driving scheme is a driving scheme where the first inductor current (i.e., a current flowing through an inductor or a magnitude thereof) is continuously changed based on a first switching control signal (e.g., a first Pulse Width Modulation (PWM) signal) for allowing the transistors to be turned on and turned off. For example, each of the first driving scheme and the second driving scheme may be a Continuous Conduction Mode (CCM) scheme.

The first power voltage VDD has influence (e.g., a large influence or the largest influence) on emission of the pixel PX. Therefore, in order to achieve output stability of the first power voltage VDD, the first converter 510 may be driven exclusively in a CCM scheme regardless of a load of the display panel 100.

A more detailed configuration and operation of the first converter 510 will be described later with reference to FIG. 3.

The second converter 520 may generate the second power voltage VSS using a third driving scheme where a second inductor current is generated with a turn-on number (or switching number) smaller than those of the first and second driving schemes (e.g., the transistors used to drive the second converter 520 may be switched less frequently). For example, the second converter 520 may output the second power voltage VSS using the third driving scheme including a discontinuous period in which the magnitude of the second inductor current is changed based on a second switching control signal (or second PWM signal). The discontinuous period may correspond to a period in which transistors included in the second converter 520 are all in a state in which they are turned off. In an example, the third driving scheme may be a Pulse Skip Mode (PSM) scheme. In another example, the third driving scheme may decrease a turn-on number of the transistors by lowering frequency (e.g., switching frequency), using a Pulse Frequency Modulation (PFM) scheme.

The second converter 520 may select one of the CCM scheme, the PSM scheme, and the PFM scheme according to the magnitude of a load (e.g., an emission luminance) of the display panel 100, and may be driven using the selected scheme. For example, the second converter 520 may select the CCM scheme when the display panel 100 emits light with a high luminance (or when the display panel 100 has a high load), select the PSM scheme when the display panel 100 emits light with an intermediate luminance, and select the PFM scheme when the display panel 100 emits light with a low luminance.

The third converter 530 may be operated in a scheme similar to that of the second converter 520. For example, in the normal mode, the third converter 530 may select one of the CCM scheme, the PSM scheme, and the PFM scheme according to the magnitude of a load (e.g., an emission luminance) of the display panel 100, and be driven using the selected scheme. In the low power mode, the third converter 530 may output the third power voltage VLIN, using the PSM scheme or the PFM scheme.

As described with reference to FIG. 2, in some embodiments, the DC-DC converter 500 includes the first converter 510, the second converter 520, and the third converter 530, drives the first converter 510, the second converter 520, and the third converter 530 in the normal mode, and drives only the third converter 530 in the low power mode, so that power consumption can be reduced. Further, in some embodiments, the second converter 520 and the third converter 530 adaptively select a driving scheme (e.g., the PSM scheme or the PFM scheme) according to a load of the display panel 100, so that power consumption can be further reduced.

Figure 3:
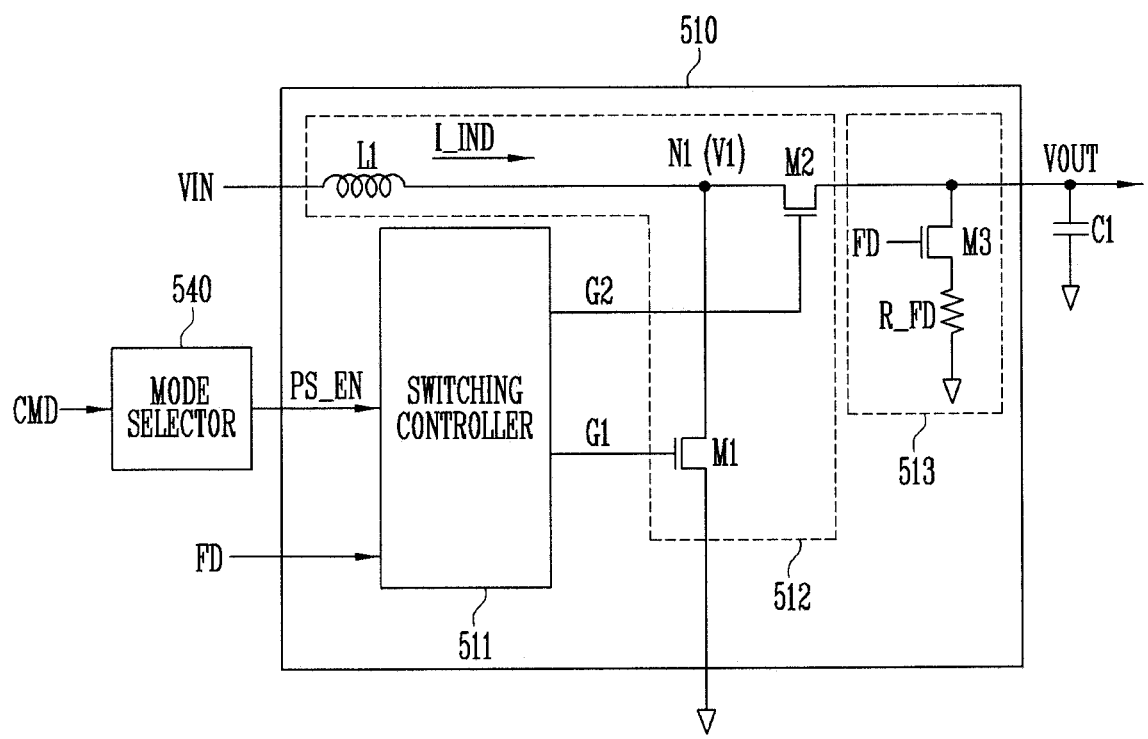
FIG. 3 is a circuit diagram illustrating an example of a first converter included in the DC-DC converter of FIG. 2.

FIG. 3 is a circuit diagram illustrating a first converter included in the DC-DC converter of FIG. 2 according to embodiments of the present disclosure.

Referring to FIG. 3, the first converter 510 may include a switching controller 511, a switch 512, and a discharger (or discharge circuit) 513.

The DC-DC converter 500 may further include a mode selector 540.

The mode selector 540 generates a mode control signal PS_EN, based on a command CMD (e.g., a power control signal) from the outside (e.g., outside the display device 10), and may enable the mode control signal PS_EN in a black image period. The mode control signal PS_EN may be provided to the first converter 510, the second converter 520 (see FIG. 2), and the third converter 530 (see FIG. 2).

A period in which the mode control signal PS_EN is enabled (or is at a first level) may correspond to the low power mode, and a period in which the mode control signal PS_EN is disabled (or is at a second level) may correspond to the normal mode.

The switch 512 may include a first inductor L1, a first transistor M1, and a second transistor M2.

The first converter 510 may output a first power voltage VDD by converting an input voltage VIN, based on the mode control signal PS_EN.

The first inductor L1 may be coupled between an input end of the first converter to which the input voltage VIN is applied and a first node N1. The first power voltage VDD may be controlled based on a first inductor current I_IND flowing through the first inductor L1.

The first transistor M1 may be coupled between the first node N1 and a ground (or ground voltage). The first transistor M1 may receive a first control signal G1 from the switching controller 511 to be turned on, and control a current to flow through the first inductor L1.

The second transistor M2 may be coupled between the first node N1 and an output end of the first converter from which the first power voltage VDD is output. The second transistor M2 and the first transistor M1 may be alternately turned on. Thus, after an electromotive force is generated in the first inductor L1 while the first transistor M1 is turned on, the second transistor M2 is turned on and the first transistor M1 is turned off, so that a first node voltage V1 can be converted into the first power voltage VDD. The second transistor M2 may receive a second control signal G2 from the switching controller 511 to be turned on.

The discharger 513 may include a third transistor M3 and a resistor R_FD. The third transistor M3 and the resistor R_FD may be coupled in series to each other between an output end of the first converter and ground.

The third transistor M3 may receive a discharge control signal FD in the normal mode or an off mode (i.e., a mode in which the display panel 100 displays no image) to be turned on, and maintain a turn-off state in the low power mode. The discharge control signal FD may be included in the power control signal SWIRE (see FIG. 1) to be provided from the data driver 300 or to be provided from the timing controller 400. For example, the third transistor M3 may be turned on in response to the discharge control signal FD having a turn-on voltage level, and be turned off in response to the discharge control signal FD having a turn-off voltage level. An impedance of the output end of the first converter 510 in the low power mode may be larger than that of the output end of the first converter 510 in the normal mode.

The first converter 510 allows the third transistor M3 to be turned on in the normal mode or the off mode, so that a driving current remaining in the display panel 100 is rapidly discharged. In addition, the display panel 100 can be maintained in a black state, or a screen of the display panel 100 can be rapidly switched. The first converter 510 allows the third transistor M3 to be turned off in the low power mode, so that the impedance of the output end of the first converter 510 decreases. In addition, a driving current can be prevented from being leaked from the display panel 100 to the first converter 510.

The switching controller 511 may control the on/off state of the first transistor M1 and the second transistor M2. The first transistor M1 and the second transistor M2 may be alternately turned on and off under the control of the switching controller 511.

In some embodiments, the switching controller 511 may allow the first transistor M1 and the second transistor M2 to be sequentially turned on (e.g., the first transistor M1 may be turned on and the second transistor M2 may be off; then the first transistor M1 may be turned off and the second transistor M2 may be turned on; then the second transistor M2 may be turned off while the first transistor M1 may remain off) when the display panel 100 is initially driven in the normal mode, and allow the first transistor M1 and the second transistor M2 to be consecutively and alternately turned on (e.g., one of the first and second transistors M1 and M2 may be turned on while the other transistor is turned off, and the transistors may alternate which transistor is in which state) at the time when the voltage level of an output voltage VOUT (i.e., the first power voltage VDD) output through the output end is equal to that of the input voltage VIN. That is, the first converter 510 may output the first power voltage VDD using a first driving scheme when the display panel 100 is driven in the normal mode (e.g., initially driven). Also, the switching controller 511 may allow the first transistor M1 and the second transistor M2 to be consecutively and alternately turned on when the mode of the display panel 100 is switched from the low power mode to the normal mode (i.e., hard switching). That is, the first converter 510 may output the first power voltage VDD using a second driving scheme when the mode of the display panel 100 is switched from the low power mode to the normal mode.

The embodiments of the first driving scheme and the second driving scheme will be described in more detail with reference to FIGS. 4A and 4B.

Figure 4B:
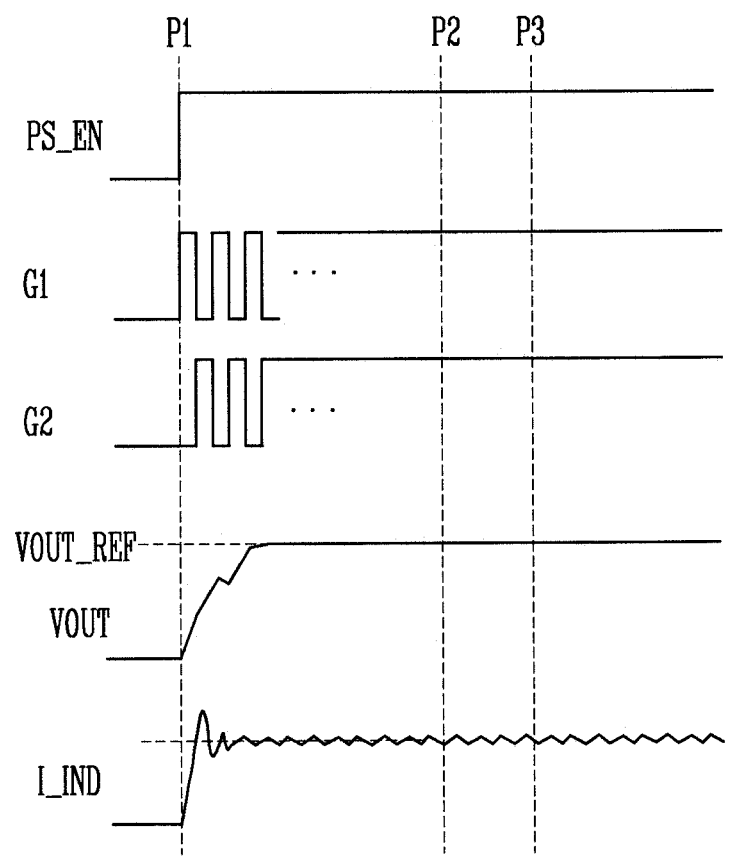

FIGS. 4A and 4B are waveform diagrams illustrating embodiments of signals according to the driving schemes of the first converter of FIG. 3. FIG. 4A illustrates signals in the first converter 510 when the first converter 510 uses the first driving scheme, and FIG. 4B illustrates signals measured in the first converter 510 when the first converter 510 uses the second driving scheme.

Referring to FIGS. 3 and 4A, the state of a mode control signal PS_EN may be switched from a disable state to an enable state at a first time P1.

The switching controller 511 may output a first switching control signal G1 and/or a second control signal G2 in an impulse form (e.g., in the form of a single pulse) in response the mode control signal PS_EN. For example, the switching controller 511 may sequentially output first and second control signals G1 and G2 in the impulse form.

After an electromotive force is generated in the first inductor L1 due to the first transistor M1 being turned on in response to the first control signal G1, the second transistor M2 is turned on in response to the second control signal G2, so that a first node voltage V1 of the first node N1 may be charged at the output end. That is, an output voltage VOUT of the output end may be precharged with an input voltage VIN.

Subsequently, at a second time P2, the switching controller 511 may output the first switching control signals G1 or G2 having a specific (e.g., set or predetermined) driving frequency. For example, the switching controller 511 may output the first and second control signals G1 and G2 that have a turn-on voltage level and a turn-off voltage level in a specific period.

The second time P2 may be a time at which the output voltage VOUT is equal to the input voltage VIN or a time thereafter, or a time at which a reference voltage V_REF of which the voltage level increases over time (e.g., linearly increases) is equal to the output voltage VOUT.

The first transistor M1 and the second transistor M2 may be alternately turned on in response to the first control signal G1 and the second control signal G2, respectively, and the magnitude of inductor current I_IND may be increased. Accordingly, the voltage level of the output voltage VOUT may be gradually increased to a reference output voltage level VOUT_REF (i.e., the voltage level of a power voltage for use in the display panel 100).

Thus, inrush current and damage of the display panel 100 due to the inrush current can be reduced or prevented.

Referring to FIGS. 3 and 4B, the state of a mode control signal PS_EN may be switched from a disable state to an enable state at a first time P1.

The switching controller 511 may output a first switching control signal G1 and/or a second control signal G2 having a specific (e.g., set or predetermined) driving frequency in response to the mode control signal PS_EN. For example, the switching controller 511 may output first and second control signals G1 and G2 that have a turn-on voltage level and a turn-off voltage level in a specific period.

The first transistor M1 and the second transistor M2 may be alternately turned on in response to the first control signal G1 and the second control signal G2, respectively, and the magnitude of inductor current I_IND may be increased. Accordingly, the voltage level of an output voltage VOUT may be rapidly increased to a reference output voltage level VOUT_REF (i.e., the voltage level of a power voltage for use in the display panel 100). The voltage level of the output voltage VOUT may reach the reference output voltage level VOUT_REF before a second time P2.

As precharging with respect to an input voltage VIN may not be performed during the second driving scheme, inrush current exceeding a reference current could be generated.

However, the first converter 510 uses the second driving scheme when the mode of the display panel 100 is switched from the low power mode to the normal mode. In this state, a first auxiliary power voltage U_VDD has been applied to the display panel 100 at the time P1 (e.g., leading up to P1), which may be similar or identical to a state in which the display panel 100 is precharged with the first auxiliary power voltage U_VDD. Thus, damage of the display panel 100 due to the inrush current can be reduced or eliminated.

Referring back to FIG. 3, the switching controller 511 may determine a driving scheme of the first transistor M1 and the second transistor M2 based on the discharge control signal FD. In some embodiments, the discharge control signal FD may have a turn-on voltage level when the display panel 100 is initially driven (e.g., leading up to the time when the display panel 100 is initially driven) so as to maintain the display panel 100 as displaying a black screen, and the switching controller 511 may select the first driving scheme when the discharge control signal FD has or had the turn-on voltage level. In some embodiments, the discharge control signal FD may have a turn-off voltage level when the display panel 100 is driven in the low power mode so as to prevent current leakage from the display panel 100 to the first converter 510, and the switching controller 511 may select the second driving scheme when the discharge control signal FD has or had the turn-off voltage level.

Thus, the first converter 510 can determine a driving scheme with a circuit configuration using the discharge control signal FD.

As described with reference to FIGS. 3 to 4B, in some embodiments, the first converter 510 determines whether the previous mode of the display panel 100 is the low power mode, and selectively uses the first driving scheme and the second driving scheme based on the determination result. Thus, damage of the display panel 100 due to inrush current can be reduced or prevented, and a drop of a power voltage in a process of changing over or transferring the power voltage of the display panel 100 and deterioration of display quality due to the drop of the power voltage can be prevented or reduced. Further, in some embodiments, the first converter 510 determines whether the previous mode of the display panel 100 is the low power mode (or whether to apply precharging), based on the discharge control signal FD, so that a driving scheme can be easily determined with a circuit configuration (e.g., a simple circuit configuration or only a simple circuit configuration).

Figure 5:
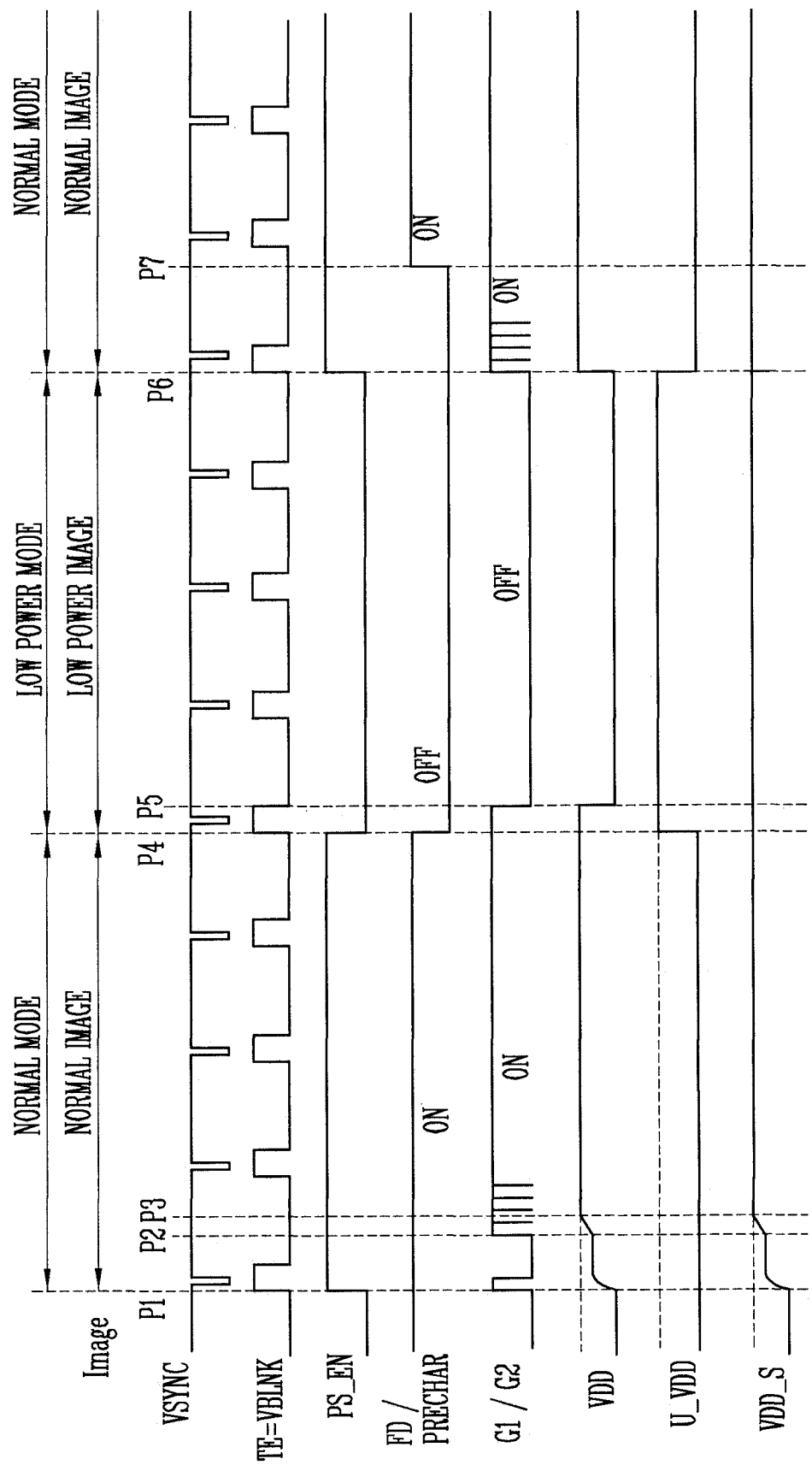
FIG. 5 is a waveform diagram illustrating an example of an operation of the display device of FIG. 1.

FIG. 5 is a waveform diagram illustrating an example of an operation of the display device of FIG. 1.

Referring to FIGS. 1, 3, and 5, the display panel 100 may display a normal image in the normal mode, and display a low power image such as a clock image in the low power mode.

A mode control signal PS_EN may be in an enable state in the normal mode, and be in a disable state in the low power mode.

The first converter 510 is operated in the normal mode, and may, in some embodiments, not be operated in the low power mode. Meanwhile, the data driver 300 may generate and output a first auxiliary power voltage U_VDD in the low power mode.

The state of the mode control signal PS_EN may be switched in a vertical blank period VBLNK. The vertical blank period VBLNK may be a black period, and overlap with a vertical synchronization signal VSYNC.

A discharge control signal FD (i.e., a control signal for allowing the third transistor M3 of the first converter 510 described with reference to FIG. 3 to be turned on or turned off) or a precharging signal PRECHAR (i.e., a signal controlling whether a precharging function of the first converter is applied or representing whether a precharging function of the first converter 510 is to be applied) may be in the enable state (or have a turn-on voltage level) in the normal mode, and be in the disable state (or have a turn-off voltage level) in the low power mode.

The display device 10 may be turned on at a first time P1. As can be seen in FIG. 5, prior to time P1, the discharge control signal FD or precharging signal PRECHAR may already have been in an enable state. Accordingly, the mode control signal PS_EN may be in the enable state, and the first converter 510 may start generation of a first power voltage VDD.

When the discharge control signal has the turn-off voltage level and the previous mode of the display panel 100 was not the low power mode, the first converter 510 may generate and output the first power voltage VDD using a first driving scheme, such as the first driving scheme described with reference to FIG. 4A. That is, the switching controller 511 may generate a switching control signal G1/G2 in an impulse form, and accordingly, the voltage level of the first power voltage VDD may be gradually increased to that of an input voltage VIN through precharging of the input voltage VIN.

Subsequently, at a second time P2 (e.g., after the voltage level of the first power voltage VDD is equal to that of the input voltage VIN), the switching controller 511 may generate a switching control signal G1/G2 having a specific (e.g., set or predetermined) driving frequency, the first transistor M1 and the second transistor M2 may be alternately turned on in response to the switching control signal G1/G2, and the first power voltage VDD may be increased to a reference output voltage level.

At a third time P3 after a time (e.g., a specific, set, or predetermined time) elapses from the first time P1, the first power voltage VDD may reach the reference output voltage level. The first power voltage VDD may then maintain the reference output voltage level.

Meanwhile, the data driver 300 may not generate the first auxiliary power voltage U_VDD in the normal mode, and a power voltage VDD_S measured at the input end of the display panel 100 (and/or the power line PL described with reference to FIG. 1) may be equal to the first power voltage VDD.

At a fourth time P4, the mode of the display panel 100 may be switched from the normal mode to the low power mode. Accordingly, the mode control signal PS_EN may be in the disabled state (e.g., may be disabled), the data driver 300 may generate the first auxiliary power voltage U_VDD, and, in some embodiments, the first converter 510 may stop the generation and output of the first power voltage VDD.

In an embodiment, the first converter 510 may stop the generation and output of the first power voltage VDD at a fifth time P5 (e.g., a transition time of the vertical blank period VBLNK) after a time (e.g., a certain, set, or predetermined time) elapses from the fourth time P4 (that is, may continue generation and output of the first power voltage VDD at the fourth time P4, but discontinue doing so at the fifth time P5).

The data driver 300 has a smaller output than that of the first converter 510 (e.g., lower power), and may be used to display a low power image which presents a smaller load to the data driver 300 than a normal image presents to the first converter 510. Therefore, although the first power voltage VDD and the first auxiliary power voltage U_VDD partially overlap with each other (e.g., may both be generated at the same time during some periods), the first converter 510 may be influenced (e.g., slightly influenced) by an operation of the data driver 300.

However, the first converter 510 is not limited to such embodiments, and in other embodiments may stop the generation and output of the first power voltage VDD at the fourth time P4.

The power voltage VDD_S measured at the input end of the display panel 100 during this period may be equal to the first auxiliary power voltage U_VDD.

Subsequently, at a sixth time P6, the mode of the display panel 100 may be switched from the low power mode to the normal mode. Accordingly, the mode control signal PS_EN may be in the enabled state (e.g., may be enabled), the first converter 510 may generate and output the first power voltage VDD, and the data driver 300 may stop the generation of the first auxiliary power voltage U_VDD.

When the discharge control signal FD has the turn-on voltage level and the previous mode of the display panel 100 is the low power mode, the first converter 510 may generate and output the first power voltage VDD using a second driving scheme, such as the second driving scheme described with reference to FIG. 4B. That is, the switching controller 511 may not perform the precharging of the input voltage VIN, and may rapidly increase the voltage level of the first power voltage VDD.

At a seventh time P7 after a time (e.g., a certain, set, or predetermined time) elapses from the sixth time P6, the voltage level of the discharge control signal FD may be switched to the turn-on voltage level. An output end (i.e., an output end for outputting the first auxiliary power voltage U_VDD) of the data driver 300 may have a high impedance, and electrical coupling between the data driver 300 and the display panel 100 can be interrupted.

The power voltage VDD_S measured at the input end of the display panel 100 during this period may be equal to the first power voltage VDD. In some embodiments, a voltage drop may occur at the sixth time P6, and the time for which the voltage drop occurs is shorter than the vertical blank period VBLNK, and hence deterioration of display quality by the voltage drop is reduced or eliminated.

A change of the power voltage VDD_S (e.g., a voltage drop) at the sixth time P6 will be described with reference to FIGS. 6A to 6C.

Figure 6A:
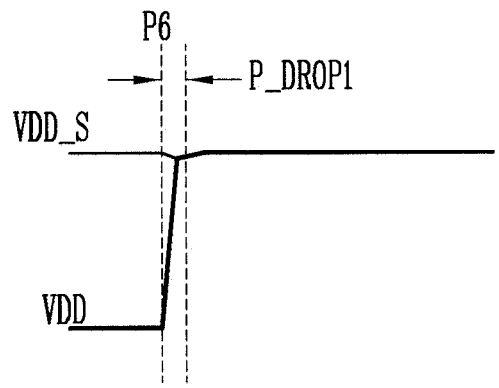
FIGS. 6A to 6C are waveform diagrams illustrating an example of a first power voltage at a sixth time of FIG. 5.
Figure 6B:
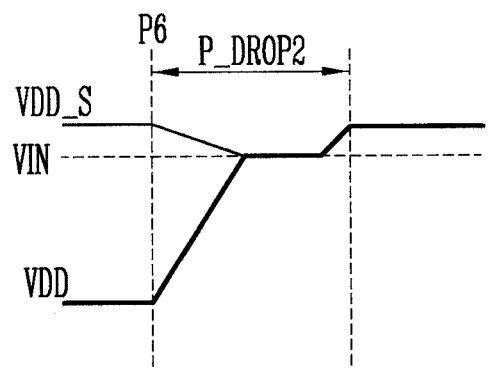
Figure 6C:
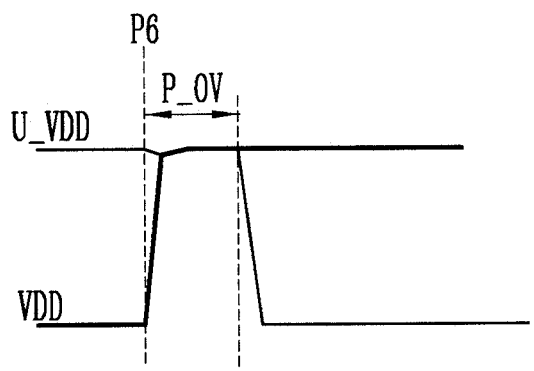

FIGS. 6A to 6C are waveform diagrams illustrating embodiments of the first power voltage VDD at the sixth time of FIG. 5. FIG. 6A illustrates an example of the first power voltage VDD and the power voltage VDD_S, according to embodiments of the present disclosure (e.g., which are measured in the display device 10 of FIG. 1), and FIG. 6B illustrates a comparative example corresponding to FIG. 6A. FIG. 6C illustrates an example of the first power voltage VDD and the first auxiliary power voltage U_VDD, according to embodiments of the present disclosure (e.g., which are measured in the display device 10 of FIG. 1).

First, referring to FIG. 6A, at the sixth time P6, the power voltage VDD_S may drop when the supply of the first auxiliary power voltage U_VDD is interrupted. However, since the first power voltage VDD is rapidly increased according to the second driving scheme of the first converter 510, the power voltage VDD_S may be again increased to the reference output voltage level within a first time P_DROP1 (e.g., ⅒ of a frame or less) from the sixth time P6.

Referring to FIG. 6B, at the sixth time P6, when the first power voltage VDD is gradually increased and precharged according to the first driving scheme of the first converter 510, the power voltage VDD_S may drop to a voltage level equal to that of the input voltage VIN during a second time P_DROP2 (e.g., 1 to 2 frames). Therefore, deterioration of display quality (e.g. screen flicker) may be perceivable by a user.

Referring to FIG. 6C, in some embodiments, the data driver 300 does not interrupt the supply of the first auxiliary power voltage U_VDD at the sixth time P6, but may interrupt the supply of the first auxiliary power voltage U_VDD after the voltage of the first power voltage VDD reaches the reference output voltage level.

For example, the data driver 300 may interrupt the supply of the first auxiliary power voltage U_VDD at a time after a reference time P_OV elapses from the sixth time P6. Therefore, a drop of the power voltage VDD_S may be reduced or eliminated.

The data driver 300 may be influenced by partial overlapping of the first power voltage VDD and the first auxiliary power voltage U_VDD (e.g., generation of both the first power voltage VDD and the first auxiliary power voltage U_VDD at the same time). An over-current prevention circuit, etc., may prevent or eliminate damage of the data driver 300.

As described with reference to FIGS. 5 to 6C, in some embodiments, when the mode of the display panel 100 is switched from the low power mode to the normal mode, the display device 10 rapidly changes the first power voltage VDD, so that deterioration of display quality due to the drop of the power voltage VDD_S can be prevented. Further, in some embodiments, the first auxiliary power voltage U_VDD is interrupted after the first power voltage VDD reaches the reference output voltage level, so that the drop of the power voltage VDD_S can be more effectively reduced or prevented.

Figure 7:
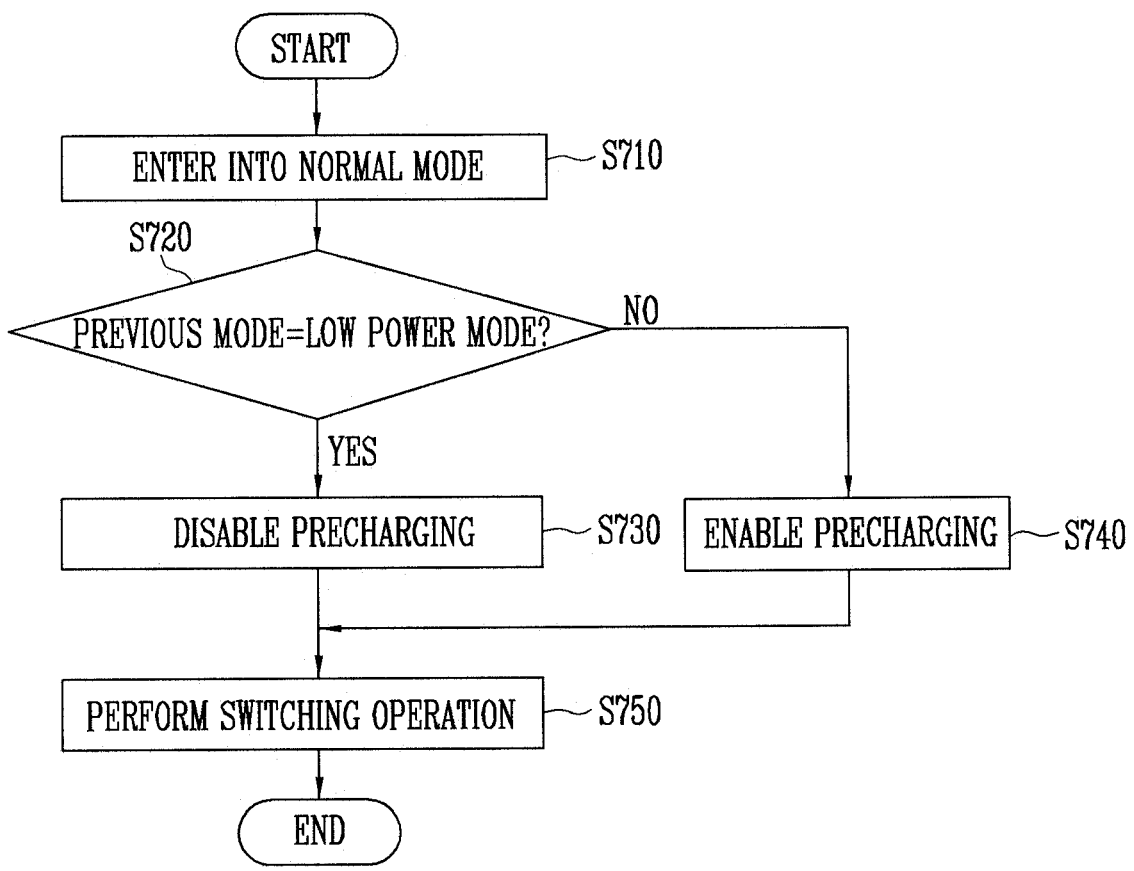
FIG. 7 is a flowchart illustrating a method for driving the display device according to an embodiment of the present disclosure.

FIG. 7 is a flowchart illustrating a method for driving the display device according to an embodiment of the present disclosure.

Referring to FIGS. 1, 3, and 7, in some embodiments, the driving method of FIG. 7 may be performed in the display device 10 of FIG. 1 (or the first converter 510 of FIG. 3).

The driving method of FIG. 7 may enter into a normal mode. For example, a normal image may be received from the outside (e.g., outside the display device 10), and preparation may be made for display of the normal image through the display panel (S710).

The method of FIG. 7 may determine whether the previous mode (that is, a driving mode in a period just before the method of FIG. 7 enters into the normal mode) was a low power mode (S720).

As described with reference to FIG. 3, in some embodiments, the method of FIG. 7 may determine whether the previous mode was the low power mode based on the state of a discharge control signal FD provided to the first converter 510.

The method of FIG. 7 may generate a first power voltage by selecting one of a first driving scheme and a second driving scheme based on the determination result. The first driving scheme may be the driving method of the first converter 510 which is described with reference to FIG. 4A, and the second driving scheme may be the driving method of the first converter 510 which is described with reference to FIG. 4B.

When the previous mode is the low power mode, the method of FIG. 7 may disable a precharging function of the first converter 510 (S730). Accordingly, the method of FIG. 7 may rapidly change the voltage level of the first power voltage VDD to a reference output voltage level VOUT_REF during a second period by driving the first converter 510 using the second driving scheme. That is, a switching (or hard switching) operation may be performed, in which the first and second transistors M1 and M2 (see FIG. 3) of the first converter 510 are alternately turned on (S750).

Alternatively, when the previous mode was not the low power mode, the method of FIG. 7 may enable the precharging function of the first converter 510 (S740). Accordingly, the method of FIG. 7 may gradually change the voltage level of the first power voltage VDD to the reference output voltage level during a first period longer than the second period by driving the first converter 510 using the first driving scheme. After precharging using the input voltage VIN (see FIG. 3), the switching operation may be performed (S750).

In the DC-DC converter, the display device having the same, and the driving method thereof according to the present disclosure, the first power voltage may be gradually increased when the display panel initially enters into the normal mode, so that damage of the display panel due to inrush current can be prevented. Further, the first power voltage may be rapidly changed when the mode of the display panel is switched from the low power mode to the normal mode, so that deterioration of display quality due to a voltage drop can be prevented.

The electronic or electric devices and/or any other relevant devices or components according to embodiments of the present invention described herein (e.g., the timing controller 400, the gate driver 200, the data driver 300, the DC-DC converter 500, and/or components thereof) may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:
    a display panel comprising a plurality of pixels and a power line, the display panel being configured to display an image in a normal mode and to display an image in a low power mode;
    a data driver configured to provide a data signal to the display panel; and
    a DC-DC converter configured to supply a source driving voltage to the data driver, and to supply a first power voltage to the power line of the display panel in the normal mode,
    wherein the data driver supplies a first auxiliary power voltage to the power line of the display panel in the low power mode,
    wherein the DC-DC converter is configured to output the first power voltage and to change a voltage level of the first power voltage to a reference output voltage level over a first period when the display panel initially enters into the normal mode when the display panel is turned on at a beginning of the first period, and
    wherein the DC-DC converter is configured to output the first power voltage and to change the voltage level of the first power voltage to the reference output voltage level over a second period that is shorter than the first period when the display panel is switched from the low power mode to the normal mode.

2. The display device of claim 1, wherein the display panel is configured to display a normal image in the normal mode, and to display a low power image having a load smaller than a load of the normal image in the low power mode.

3. The display device of claim 1, wherein the DC-DC converter comprises an inductor and a plurality of transistors coupled between a reception terminal for receiving an input voltage and an output terminal for outputting the first power voltage,
    wherein, when the display panel initially enters into the normal mode, the DC-DC converter is configured to precharge the input voltage by turning on one of the transistors, and
    wherein the DC-DC converter is configured to, after the input voltage is precharged, output the first power voltage using a driving scheme where a first inductor current is generated by alternately turning on the transistors.

4. The display device of claim 3, wherein the DC-DC converter is configured to, when the display panel is switched from the low power mode to the normal mode, output the first power voltage using a second driving scheme where the first inductor current is generated by alternately turning on the transistors.

5. The display device of claim 1, further comprising a gate driver configured to provide a gate signal to the display panel,
    wherein the data driver is configured to generate a first high voltage and a first low voltage based on the source driving voltage, and to supply the first high voltage and the first low voltage to the gate driver,
    wherein one of the first high voltage and the first low voltage has a turn-on voltage level configured to turn a transistor on when applied to a gate of the transistor, and
    the other of the first high voltage and the first low voltage has a turn-off voltage level configured to turn the transistor off when applied to the gate of the transistor.

6. The display device of claim 1, wherein the DC-DC converter comprises:
    a first converter configured to generate the first power voltage;
    a second converter configured to generate a second power voltage having a voltage level lower than the voltage level of the first power voltage; and
    a third converter configured to generate the source driving voltage,
    wherein the second converter is configured to supply the second power voltage to the display panel in the normal mode.

7. The display device of claim 6, wherein the first converter comprises:
    a first inductor coupled between an input end to which an input voltage is applied and a first node;
    a first transistor coupled between the first node and a ground, the first transistor being configured to turn on in response to a first switching control signal;
    a second transistor coupled between an output end from which the first power voltage is output and the first node, the second transistor being configured to turn on in response to a second switching control signal; and
    a switching controller configured to generate the first switching control signal and the second switching control signal.

8. The display device of claim 7, wherein the first converter further comprises a discharge circuit coupled between the output end and the ground, and
    wherein an impedance of the discharge circuit in the low power mode is larger than an impedance of the discharge circuit in the normal mode.

9. The display device of claim 8, wherein the discharge circuit comprises a third transistor coupled between the output end and the ground, and
    wherein the third transistor is configured to turn on in response to a discharge control signal having a turn-on voltage level in the normal mode, and to turn off in response to the discharge control signal having a turn-off voltage level in the low power mode.

10. The display device of claim 9, wherein the switching controller is configured to select a driving scheme of the first and second transistors based on the voltage level of the discharge control signal.

11. The display device of claim 9, wherein the discharge control signal is received from the data driver.

12. The display device of claim 7, wherein the first converter is configured to output the first power voltage using a first driving scheme when the display panel enters into the normal mode but is not switched from the low power mode, wherein in the first driving scheme, a first inductor current through the first inductor is generated by sequentially turning on the first and second transistors when the display panel initially enters into the normal mode and alternately turning on the first and second transistors after the voltage level of the output voltage is equal to the voltage level of the input voltage.

13. The display device of claim 12, wherein the first converter is configured to output the first power voltage using a second driving scheme when the display panel is switched from the low power mode to the normal mode, wherein in the second driving scheme, the first inductor current is generated by alternately turning on the first and second transistors.

14. The display device of claim 1, wherein the DC-DC converter is configured to generate a mode control signal for switching between the normal mode and the low power mode,
wherein the first power voltage increases at a transition time of the mode control signal, and
the first auxiliary power voltage decreases at the transition time of the mode control signal.

15. The display device of claim 1, wherein the DC-DC converter is configured to generate a mode control signal for switching between the normal mode and the low power mode,
wherein the first power voltage increases at a transition time of the mode control signal, and
the first auxiliary power voltage decreases after the first power voltage reaches a reference output voltage.

16. A DC-DC converter comprising:
a first inductor coupled between an input end to which an input voltage is applied and a first node;
a first transistor coupled between the first node and a ground, the first transistor being configured to turn on in response to a first switching control signal;
a second transistor coupled between an output end from which a first power voltage is output and the first node, the second transistor being configured to turn on in response to a second switching control signal; and
a switching controller configured to generate the first switching control signal and the second switching control signal,
wherein the first power voltage of a first level is applied to a display panel from the output end in a normal mode, and the first power voltage of a second level that is lower than the first level is applied to the display panel from the output end in a low power mode, the display panel having the normal mode and the low power mode,
wherein the switching controller is configured to sequentially turn on the first and second transistors when the display panel initially enters into the normal mode, and to alternately turn on the first and second transistors after a voltage level of the output voltage is equal to the voltage level of the input voltage, and
wherein the switching controller is configured to alternately turn on the first and second transistors when the display panel is switched from the low power mode to the normal mode.

17. The DC-DC converter of claim 16, wherein a voltage level of the first power voltage is changed to a reference output voltage level over a first period when the display panel initially enters into the normal mode, and
wherein the voltage level of the first power voltage is changed to the reference output voltage level over a second period shorter than the first period when the display panel is switched from the low power mode to the normal mode.

18. The DC-DC converter of claim 16, further comprising a third transistor coupled between the output end and the ground,
wherein the third transistor is configured to turn on in response to a discharge control signal having a turn-on voltage level in the normal mode, and to turn off in response to the discharge control signal having a turn-off voltage level in the low power mode.

19. The DC-DC converter of claim 18, wherein the switching controller is configured to select a driving scheme of the first and second transistors based on a voltage level of the discharge control signal.

20. A method of driving a display device, the method comprising:
driving a display panel in a normal mode;
determining whether a previous mode is a low power mode, the previous mode being a mode in a period immediately before the display panel entered into the normal mode;
selecting one of a first driving scheme and a second driving scheme based on whether the previous mode was the low power mode;
generating a first power voltage utilizing the selected driving scheme; and
supplying the first power voltage to the display panel,
wherein the generating the first power voltage comprises:
when the previous mode is not the low power mode, outputting the first power voltage and gradually changing a voltage level of the first power voltage to a reference output voltage level over a first period; and
when the previous mode is the low power mode, outputting the first power voltage and changing the voltage level of the first power voltage to the reference output voltage level over a second period shorter than the first period.

* * * * *